May 12, 1931.  E. A. WEAVER  1,804,727
PHOTOGRAPHY
Filed Nov. 2, 1921   2 Sheets-Sheet 1

Inventor:
Eastman A. Weaver.
By Roberts Roberts & Cushman
his attys.

May 12, 1931.  E. A. WEAVER  1,804,727
PHOTOGRAPHY
Filed Nov. 2, 1921  2 Sheets-Sheet 2

Inventor,
Eastman A. Weaver
by Roberts, Cushman & Woodberry,
Att'ys

Patented May 12, 1931

1,804,727

UNITED STATES PATENT OFFICE

EASTMAN A. WEAVER, OF BROOKLINE, MASSACHUSETTS, ASSIGNOR, BY MESNE ASSIGNMENTS, TO TECHNICOLOR MOTION PICTURE CORPORATION, OF BOSTON, MASSACHUSETTS, A CORPORATION OF MAINE

PHOTOGRAPHY

Application filed November 2, 1921. Serial No. 512,391.

This invention relates particularly to the production of relief pictures in gelatine or other suitable medium but it may also be utilized in the production of other kinds of photographic pictures. It has been developed for use in producing motion pictures in colors but it is also applicable in producing black-and-white motion pictures or in producing still pictures whether black-and-white or colored. In the production of color pictures the invention may be utilized either in an additive process, e. g. in which the complemental images are separately projected along a branched path into registry on a screen, or in a subtractive process, e. g. in which the complemental images are superposed in registry and projected along a single optical path.

In many branches of the art of photography difficulty has been experienced in securing the proper contrast throughout the high-light, half-tone and shadow regions respectively. In some cases the contrast is unsatisfactory only in the high-light regions or only in the shadow regions, but in few cases can satisfactory gradations (i. e. variation in optical density relative to the variation of light intensity throughout corresponding portions of the object field) be secured throughout all three regions, especially in the various color processes employing stained reliefs.

In imbibition processes for example, where stained relief matrices are employed to print the complemental images in colors upon a blank film or films, a fundamental difficulty is lack of contrast in the shadow regions or high density portions of the picture and the high density portions do not appear sufficiently different from the more moderately dense portions. Causes contributing to this are the following: First, practically all the dye from the thin portions of the relief migrates into the blank while increasing proportions of the dye are retained as the relief increases in thickness or depth. Secondly, the time required for migration of the dye from deep layers will be longer than that for thin layers, and as a commercial process requires the time of imbibition to be reduced to a minimum the deepest densities suffer somewhat from this cause. Thirdly, owing to the non-uniform spectral absorption of ordinary dyes successive additions of equal quantities of dye produce a continually decreasing series of effects on the color, since the portion of the spectrum most heavily absorbed by the dye will be largely filtered out by the earlier portions, so that the residual light is less subject to modification by the later strata. This corresponds to the well-known phenomenon experienced in using two identical color filters over a photographic lens, the second filter producing much less change in exposure than the first.

Another process in which certain of the aforesaid causes also operate against proper contrast gradations is that in which a plurality of stained complemental relief images are superposed (that is, placed back to back with their reversed images in registry and complementally disposed) and viewed with transmitted light.

A principal difficulty encountered in making photographic reproductions by means of gelatine reliefs is the tendency toward straightness of the characteristic curve, commonly called the H & D curve. In the typical curve for silver images the lower portion of the curve representing the under exposure is concave upwardly, the intermediate position representing the average exposure is straight, and the upper portion representing the over exposure which is convex upwardly (i. e., of the H & D order) corresponds more nearly to the relative or proportional evaluation made by the eye in creating visual impressions of light and shade than a gradation of density which is directly proportional to the logarithm of the time of exposure. In this connection it is to be remarked that the eye has an automatic acommodation for light quantities, which in a very bright picture makes it selectively susceptible to slight variations of high intensity and in dark pictures makes it selectively susceptible to slight variations of low intensity. When the images upon films are regarded from the point of view of optical density, whether the effective optical density is attributed to variations in relief, variations in absorption of dye or to the limiting light (spectral) absorption of the dye, it is found that they do not present such a wide range of gradations in the higher and in the lower ranges of density or transmitted light values as may be obtained in black and white. Consequently, in the relief curve the first and third portions tend to drop out, particularly when monochromatic light is employed in the exposure or in case the absorbing power of the emulsion is substantially uniform for all component colors of light employed in the exposure. This loss of the under exposure region in prior processes has rendered the use of relief images unsatisfactory.

Objects of the present invention are to correct defects in the contrast gradations of photographic images, particularly relief images for use in color photography, to control the contrast gradations at will to produce desired photographic and artistic effects, to increase the concavity of the characteristic curve in the lower portion ordinarily referred to as the under-exposure region, and to bend the upper portion of the curve to the left in some cases to the extent of rendering the upper portion concave to the left.

To the aforesaid ends the characteristic curve of an exposure made according to the present invention may show an under-exposure character for low densities or low heights of relief or a similar character for higher values or it may exhibit both of these characteristics, the invention not only correcting the straightness of the curve for low exposures but also counteracting over-exposure effects.

While the characteristic curve of a relief image does not have an over-exposure portion such as that of silver images above referred to, when the relief is impregnated with a dye which does not uniformly absorb all visible wave lengths an effect results which is optically equivalent to that represented by the over-exposure region of the silver image curve as above indicated. This is due to the fact that as the concentration of the dye increases, progressively from lower to higher densities, the proportion of light available for it to absorb decreases, so that the addition of dye above a certain general amount has little effect in increasing the optical density because the volume of transmitted light is at such a point prematurely reduced below the quantity required to be accurately visible and accordingly any further variations are not discernible. The shift to the left of the upper end of the characteristic curve produced by the present invention tends to compensate for this apparent over-exposure effect by causing gradations of the relief for normally equivalent increments of exposure to increase as these increments are successively added.

The present invention depends upon the progressive absorption of light in the emulsion layer of the blank film upon which the relief images are to be formed. The top or boundary of the relief is always determined by a certain critical or threshold exposure which is just reached at this level. The distance of the level in question from the entrant or printing surface naturally depends upon the original intensity of the light as well as upon the rate of absorption in the emulsion layer. That is, an originally strong light will penetrate further before being reduced to the critical or threshold value than will a light which was originally weaker, if both are absorbed at the same rate. Thus, the varying distributions of intensity which constitute the printing image will be transformed into similarly varied elevations of the relief. If a monochromatic light is employed in printing it follows from the ordinary laws of absorption that the height of the relief will be proportional to the logarithm of the intensity in all cases. The gradations of the relief (i. e. variation in relief-thickness relative to variation in light intensity throughout corresponding portions of the object field), on the other hand, will be determined by the absorbing power of the emulsion for the light in question. That is, if the absorbing power is large a relatively flat or a gently sloping relief will be formed, while if the absorbing power is low a steeper gradation will result.

Now if the printing is effected with a mixture of the light which is strongly absorbed by the emulsion and the one which is weakly absorbed thereby, the resulting gradation will have some sort of intermediate character. While it is not feasible to make the same emulsion differently absorptive for the same monochromatic light, it is relatively easy to render it differently absorptive for lights of different wave lengths. For example, suppose that the emulsion is impregnated with a greenish-yellow dye which strongly absorbs violet and blue but which strongly transmits blue-green and green rays. If such an emulsion is exposed with blue or violet light the variations in the thickness of the relief will be relatively slight; while if exposed to the same negative with blue-green and green light the variations will be more pronounced. In other words the exposure with the blue or violet light would yield an image having a lower contrast gradient than the exposure with the blue-green and green.

Successive exposures to the aforesaid two lights would yield an intermediate gradation effect, but this effect would not constitute merely an average of the separate effects of the two lights as represented by a contrast gradient intermediate therebetween. On the contrary the characteristic curve would be less steep like that of the rapidly absorbed light at its lower end and more steep like that of the slowly absorbed light at its upper end, the two portions connecting along a smooth curve and the entire curve being more or less concave upwardly. The reason for this phenomenon is that as the rapidly absorbed rays progress through the emulsion they tend to lose their effect more rapidly than the more slowly absorbed rays. Consequently the contribution to the total exposure made by the former rays is mainly limited to the entrant side of the emulsion where the high-light portions of the image, represented by the lower end of the curve, are located, while the thicker portions of the image represented by the upper end of the curve, are determined mainly by the slowly absorbed rays.

This effect is illustrated in the accompanying drawings in which,—

Fig. 1 shows the characteristic curve of the ordinary relief; and

Fig. 2 shows the characteristic curve of a relief image made by a process involving the present invention.

Figure 3:
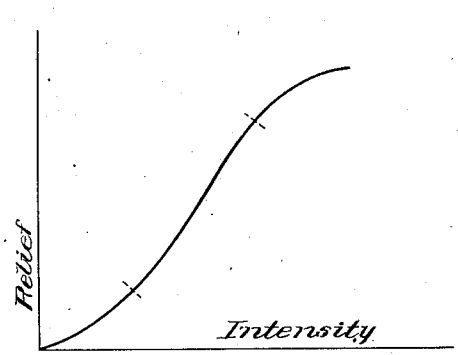
Fig. 3 illustrates a typical H & D curve for silver images.
Figure 4:
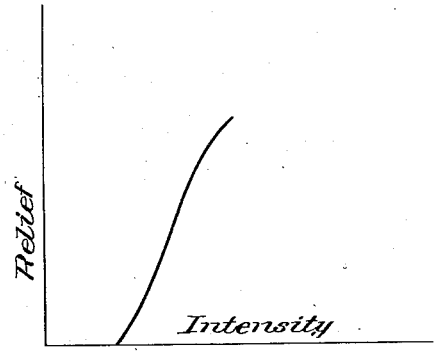
Fig. 4 illustrates a typical H & D curve for a film developed by monochromatic light.

In these figures the abscissæ represent logarithms of exposure, progressing from left to right; and progressing from right to left they represent density in the negative. The ordinates represent thickness of relief or, in the case of color reliefs, the optical density, i. e. the logarithm of the ratio of the incident to the transmitted light employed to project the images. In the figures RT and RT' represent the variations in thickness of the relief images and OD and OD' represent the optical density after the relief images have been stained or colored, each pair of relief-thickness and optical-density curves being coincident throughout their lower portions.

As shown by the straight line RT in Fig. 1, the thickness variation in the ordinary relief is uniformly proportional to the light intensities. The above-described tendency for the colored relief to show lack of contrast in the shadow portions or an over-exposure effect is illustrated by the curve OD. The effect of the present invention, as illustrated in Fig. 2, comprises a bending of the relief thickness curve RT' and the optical density curve OD' to the left, thereby resulting in exaggerated variations in thickness in the thicker portions of the image and a corresponding correction of the lack of contrast in the colored relief.

As a concrete example of one application of the invention the following is a preferred method of procedure in making a film having complemental colored relief images representing different color aspects of an object field. The negative films are preferably made with a light-dividing prism set which produces complemental images of the object field simultaneously and from the same point of view.

In one aspect the invention comprises positive film having different absorptivity for different colored light; and preferably having as least approximately thrice as great absorptivity for one portion of the actinic spectrum as for another portion. The film is preferably dyed with a dye which is more absorptive of light having a shorter wave length, such as blue, violet and ultraviolet, than light having a longer wave length, such as green and blue-green. The dye should be sharp-cutting, the absorption band preferably terminating abruptly at approximately 480 µ between blue and green.

The dye should be readily soluble in an aqueous solution of gelatine so that it may be incorporated in the gelatine emulsion before it is applied to the celluloid or other support. The dye should not crystallize out when the gelatine coating dries. The dye must be employed in large amounts substantially to affect the curvature of the characteristic curve. When using dyes such as hereinafter mentioned the amount should be approximately the maximum amount which the film will retain in noncrystalline form in the process of drying. The dye is preferably one which does not greatly sensitize the emulsion to red light so that the film may be handled in a weak dark-room light.

A dye having the aforesaid characteristics is a greenish-yellow or lemon-yellow dye such as naphthol-yellow or quinoline-yellow or a mixture of the two. The addition of quinoline-yellow appears to restrain the naphthol-yellow from crystallizing out and when using naphthol-yellow or other dye having a crystallizing tendency enough of quinoline-yellow or other suitable restrainer should be employed to counteract this tendency when incorporating the dye in the emulsion before coating the emulsion on the film. A satisfactory proportion of the dyes comprises half naphthol-yellow and half quinoline yellow, by dry weight. The positive film is dyed with a dye which differentially absorbs the printing light, as for example with the aforesaid naphthol-quinoline yellow. As above intimated the positive film is preferably dyed in the process of manufacture although it may be dyed by a bathing process subsequent to its manufacture. In printing the images a mixture of lights is used, for example one having a wave length less and one greater than approximately 480 $\mu$. The positives are then developed and converted into reliefs and stained or otherwise colored.

Figure 5:
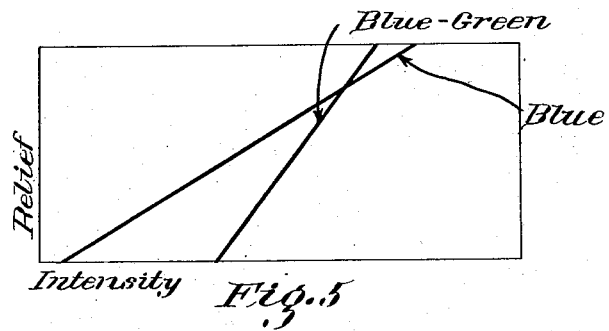
Fig. 5 illustrates diagrammatically in enlarged cross section the relief of an ordinary film as separately exposed to the H & D range of light intensities in blue and blue-green.
Figure 6:
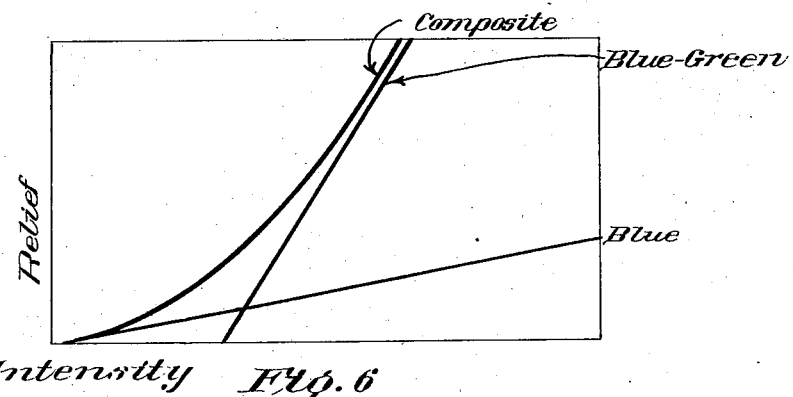
Fig. 6 illustrates in enlarged cross-section the reliefs of a film exposed to the H & D range of light intensities which has been treated in accordance with the present invention.
Figure 7:
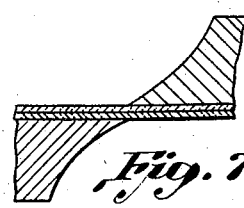
Fig. 7 shows in cross section a film having superposed complemental direct-relief images, formed in accordance with the invention.

As applied to the development of the film, this will be clear from Fig. 5 This indicates the relief thickness obtained upon an emulsion film (with given period of exposure to a given range of light intensities increasing from left to right) when a uniformly absorptive emulsion coating is used or one exposed to monochromatic light, e. g. blue or blue-green light, respectively indicated by straight line curves. A like illustration of a film treated by the procedure of this invention, that is with a specifically absorptive yellow dye, and exposed to a like range of light intensities is shown in Fig. 6. The line indicating the developed thickness due to the now more rapidly absorbed blue blue-violet or ultraviolet light is slightly advanced to the left forming a somewhat more acute angle with the horizontal while the line representing the relief due to the absorption of the blue-green light, is substantially the same. The "composite" line indicates the ultimate relief thickness (or isogram of the threshold exposures above alluded to) due to the combined development of the film emulsion effected by the rapidly absorbed blue light plus the zone developed by the less rapidly absorbed blue-green light. This curve shows a marked gradient in both the lower and upper intensities, and may have a characteristic concave curve upwardly at both ends.

It is not necessary, in order to practice the invention, to utilize two monochromatic lights, as a very similar result is attained by means of a heterogeneous mixture of lights of practically all wave lengths, some of which are strongly absorbed, some weakly absorbed. This relative heterogeneity merely decreases somewhat the degree of the curvature which is introduced into the characteristic curve of the resulting images. This degree of curvature depends again upon the so-called sharpness of cut of the dye with which the emulsion is impregnated as well as upon the amount of dye which is employed. Thus the characteristic curve representing the contrast gradations may be controlled by varying the so-called "sharpness of cut" of the pigment with which the film stock is dyed, i. e. the abruptness with which its absorption band ends, by varying the amount of dye employed, as well as by varying the relative actinic power of the printing lights, the light having the higher actinic power which has the greatest printing power due either to shorter wave length or to greater quantity.

The principle operates equally well whether the two differentially absorbed lights are employed simultaneously or in succession.

For the best results in the lower exposure regions, the strongly absorbed light should have an actinic power or exposing effect upon the film which is strongly in preponderance to that which is initially characteristic of the less powerfully absorbed light. This causes the first strata, in which the weaker exposure portions of the image are confined, to be controlled almost completely by the strongly absorbed portion of the printing light, while the subsequent strata, in which the strongly exposed portions of the images are formed, are controlled by the less strongly absorbed light.

An important advantage of the present invention is that the resulting images have substantially no halation.

The term "complemental", as employed herein, connotes images or pictures which represent different color aspects of the object field, whether or not the images are actually colored, the images being correlated to represent the object field in approximately natural colors when combined and colored, either with stains applied to the images or by the projecting or receiving light. The complemental images may or may not represent exactly complementary colors. The photographic film herein referred to is preferably though not necessarily supported on celluloid, especially when used to produce motion pictures.

Under certain conditions superior results are obtained by utilizing in conjunction with the present invention the invention disclosed in my copending application Serial No. 512,390, filed on even date herewith.

I claim:

1. Picture film which is largely absorptive of light of one color and which is largely transmissive of light of another color, the absorptivity of the film being of such character and quantity as to restrict light of the first color to a shallow depth while permitting light of the other color to penetrate deeply.

2. Picture film which is largely absorptive of light of one color to which it is substantially sensitive and which is largely transmissive of light of another color to which it is substantally sensitive permeated uniformly by a dye transparent to light of the transmitted color and relatively opaque to the light of the absorptive color, the dye being of such character and quantity as substantially to restrict light of one of said colors to a partial depth of the sensitive film while permitting light of the other color to penetrate deeply.

3. Picture film dyed with a dye adapted substantially to affect the curvature of the characteristic curve of images formed therein with light of a plurality of colors, the dye being of such character and quantity as substantially to restrict light of one of said colors to a partial depth while permitting light of another color to penetrate deeply.

4. Picture film dyed with a yellow dye in amount sufficient substantially to restrict light of one color to a partial depth while permitting light of another color to penetrate deeply.

5. Picture film which is largely absorptive of light of one color to which it is substantially sensitive and which is largely transmissive of light of another color to which it is substantially sensitive, the amount of dye being approximately the maximum amount which the film will retain in non-crystalline form in the process of drying.

6. Picture film dyed with a mixture of a dye and a restrainer for restraining the crystallization of the dye.

7. Picture film dyed with a mixture of a yellow dye and a restrainer for restraining the crystallization of the dye.

8. Picture film dyed with a mixture of naphthol-yellow and a restrainer for restraining the crystallization of the naphthol-yellow.

9. Positive film containing a dye adapted to alter the contrast gradations of pictures formed therein with lights of different colors, the dye being of such character and quantity as substantially to restrict light of one of said colors to a shallow depth while permitting light of another of said colors to which the film is sensitive to penetrate deeply.

10. Positive film dyed with a greenish yellow dye in amount sufficient to restrict light of one color to which the film is sensitive to a shallow depth while permitting light of another color to which the film is sensitive to penetrate deeply.

11. Picture film dyed with a dye comprising a yellow dye in amount sufficient to restrict light of one color to which the film is sensitive to a shallow depth while permitting light of another color to which the film is sensitive to penetrate deeply.

12. Picture film dyed with a dye adapted to produce, upon exposure to light of a plurality of colors, an image having contrast gradations represented by a characteristic curve which is upwardly concave more strongly in its upper portion than in its lower portion.

13. The method of making relief images comprising forming latent images, in a light-sensitive film which is selectively absorptive of different color components of light, with light of different colors, and controlling the contrast gradations of the images by regulating the relation between the colors of the light and the selective absorptivity of the film.

14. The method of making relief images comprising forming latent images, in a light-sensitive film which is selectively absorptive of different color components of light, with light in which a more strongly absorbed color component predominates over a less absorbed color, the relation between the color components of the printing light and the selective absorptivity of the film being predetermined to afford the desired contrast gradations in the relief image.

15. The method of making relief images comprising printing, with light of different colors, a light-sensitive film which is selectively absorptive of light of different colors, and regulating the relation between the colors of the printing light and the selective absorptivity of the film to control the contrast gradations of the images.

16. The method of forming a photographic image comprising forming, with polychromatic light having an actinically predominant color component, a latent image in a selectively absorptive film which will absorb said component more strongly than the remaining portion of the light, the relation between the color components of the light and the selective absorptivity of the film being adjusted to give the desired contrast gradations in the image.

17. The method of forming a photographic image in a film which is selectively absorptive of light of different colors comprising forming a latent image in the film with polychromatic light having one component of high actinic power and high rate of absorption by the film and having another component of low actinic power and low rate of absorption by the film.

18. The method of forming a stained relief image comprising forming a latent image in a selectively absorptive film with polychromatic light, converting the latent image into a relief image, and staining the relief image, the desired dye distribution being obtained by proportioning the color components of the polychromatic light and the selective absorptivity of the film to determine the depth gradations throughout the relief image.

19. The method of controlling the dye distribution throughout a stained relief image comprising forming a latent image in a selectively absorptive film with polychromatic light, converting the latent image into a relief image, and staining the relief image, the relation between the color components of the polychromatic light and the selective absorptivity of the film being proportioned to increase the depth variations throughout the thicker portions of the image.

20. The method of controlling the dye distribution throughout a stained relief image comprising forming a latent image in a selectively absorptive film with polychromatic light, converting the latent image into a relief image, and staining the relief image, the less strongly absorbed portion of the polychromatic light being subordinated in actinic power to the more strongly absorbed portion.

21. A relief positive having thickness gradations represented by a characteristic curve in which the upper portion is concave upwardly.

22. A relief image which has more thickness contrast in the thicker portions than in the intermediate portions.

23. A relief image which has more thickness contrast in the thicker portions than in the intermediate portions and which is substantially free from halation effects.

24. A color relief image which has at least approximately as much optical-density contrast in the shadow portions as in the half-tone portions.

25. A color relief image having optical-density gradations represented by a characteristic curve in which the upper portion is located substantially in the region above a tangent to the central portion of the curve.

26. A color relief image which has more optical-density contrast in the shadow portions than in the half-tone portions.

27. A color relief image in which the contrast gradations of optical density are at least approximately as great in the thicker portions of the image as in the intermediate portions, for the same range of light intensities in the scene.

28. A color relief image which has contrast gradations of optical density at least approximately as great in the thicker portions of the image as in the intermediate portions for the same range of light intensities in the scene and which is substantially free from halation effects.

29. A photographic film having superposed complemental relief images whose thickness gradations are represented by characteristic curves in which the upper portions are upwardly concave.

30. A photographic film having superposed complemental direct-relief images which have more thickness contrast in the thicker portions than in the intermediate portions.

31. A photographic film having superposed complemental relief images which have at least approximately as much optical-density contrast in the shadow portions as in the half-tone portions.

32. A photographic film having superposed complemental direct relief images which have more optical-density contrast in the shadow portions than in the half-tone portions.

33. A photographic film having superposed complemental direct-relief images in which the contrast gradations of optical density are at least approximately as great in the thicker portions of the image as in the intermediate portions, for the same range of light intensities.

34. A photographic film comprising an integral film having on opposite sides thereof complemental relief images having at least approximately as much optical-density contrast in the shadow portions as in the half-tone portions.

Signed by me at Boston, Massachusetts, this 29th day of October, 1921.

EASTMAN A. WEAVER.